Nov. 15, 1927.  H. BECKER  1,649,440
INTERNAL COMBUSTION ENGINE
Filed May 18, 1926
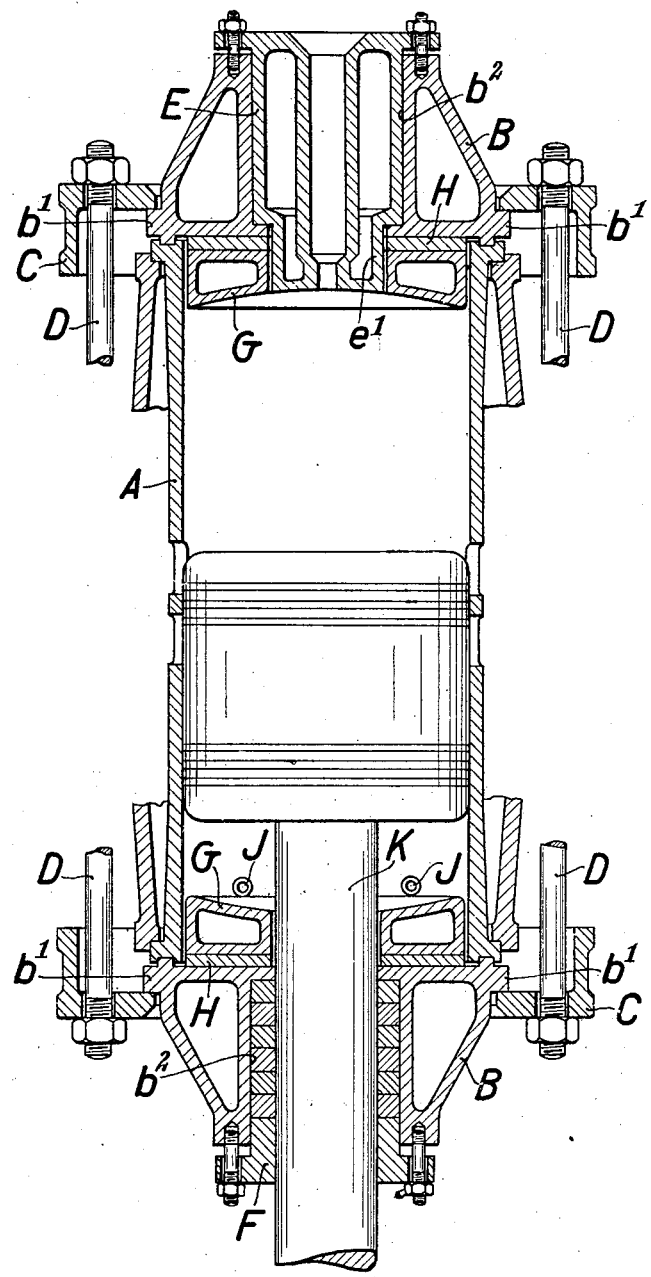
Inventor
Heinrich Becker
By Knight Bros
Attys Patented Nov. 15, 1927.

1,649,440

UNITED STATES PATENT OFFICE.

HEINRICH BECKER, OF KIEL-HASSEE, GERMANY, ASSIGNOR TO FRIED. KRUPP GERMANIAWERFT AKTIENGESELLSCHAFT, OF KIEL-GAARDEN, GERMANY.

INTERNAL-COMBUSTION ENGINE.

Application filed May 18, 1926, Serial No. 110,005, and in Germany July 3, 1925.

This invention relates to internal combustion engines and has, more particularly, reference to a new and improved arrangement of the cylinder covers of such engines.

An embodiment of the subject-matter of the invention is illustrated in the accompanying drawing which illustrates, by way of example, a longitudinal section of a double-acting internal combustion engine constructed in accordance with the invention.

A designates the cylinder of the engine and B are the two cylinder covers which are of substantially the same construction in every respect. These covers have the shape of a truncated cone and possess an annular water jacket of triangular cross-section. The covers are provided with a circumferentially extending protruding flange $b^1$ which is engaged by angular rings C which are held together by screw bolts D. The upper cover possesses a central opening $b^2$ for the reception of the valve cage E whose lower portion $e^1$, which is of a reduced diameter, projects into the cylinder and is surrounded by a water chamber G. The lower cover B is provided with an opening $b^2$ of the same size through which extends the piston rod K and which is designed to receive the piston rod stuffing box F. There is also arranged a water chamber G for the protection of the last-said cover. Disposed between the water chambers G and the covers B are plates H by means of which the size of the compression space may be altered by using them in different thicknesses. The portion $e^1$ of the valve cage E and the piston rod K have the same diameter in order to allow of making the central openings of the two covers as well as of the water chambers of the same size and obtaining entirely equal dimensions for the two covers. J are the fuel valves for the connecting rod side of the cylinder, which are so arranged that the fuel jets do not strike the connecting rod directly.

The covers of the described shape distinguish themselves by a particularly simple construction, the cone-shaped outer walls of the cover together with the inner cylindrical valve seat and the supporting surface forming a lattice truss which gives to the cover, in spite of its simple form, the necessary stiffness to withstand the cylinder forces, and makes is possible to arrange in a simple manner the ring flange $b^1$ by which the cover is fastened onto the cylinder by means of the ring C in a well known manner. Besides, in comparison with cylinder covers of normal construction in which the fastening bolts extend through the covers, any stresses that are otherwise liable to be produced by the forces of these bolts are avoided in the covers. Owing to the fact that the covers are of the same construction, one and the same spare cover may be used for the upper as well as for the lower cylinder end. This is also the case for the water chambers G and the plates H.

Claims:

1. In a double-acting internal combustion engine, cylinder covers in the form of truncated cones, the outer walls of which are adapted to give the cover the strength required for the transmission of the piston forces, openings in the covers for the reception of the valve cage and the piston rod stuffing box, said openings having the same diameter so as to allow of making the two covers of the same construction and exchanging them one for the other.

2. In a double-acting internal combustion engine, cylinder covers in the form of truncated cones, openings in the covers for the reception of the valve cage and the piston rod stuffing box, a reduced end portion on the valve cage arranged to extend beyond the cover into the interior of the cylinder, water chambers on the inner sides of the covers arranged to surround the reduced end portion of the valve cage and the piston rod, the said end portion and the piston rod being of the same diameter so that the water chambers may be made of substantially similar constructions and dimensions and interchanged mutually.

3. In a double-acting internal combustion engine, cylinder covers in the form of truncated cones, water chambers on the inner faces of the covers, openings of equal size in the covers for the reception of the valve cage and the piston rod stuffing box, and plates interposed between the covers and the water chambers and adapted to alter the size of the compression space of the two cylinder sides by using them in different thicknesses.

The foregoing specification signed at Hamburg, Germany, this twenty-seventh day of April, 1926.

HEINRICH BECKER.